United States Patent Office 3,245,798
Patented Apr. 12, 1966

3,245,798
SOLUBLE FUMARIC ACID AND ADIPIC ACID
COMPOSITIONS
John Hoole Van Ness, Kirkwood, Mo., assignor to Monsanto Company, St. Louis, Mo., a corporation of Delaware
No Drawing. Filed Aug. 4, 1964, Ser. No. 387,493
7 Claims. (Cl. 99—78)

This application is a continuation-in-part of application Serial Number 281,780 filed May 20, 1963, and now abandoned.

This invention relates to granular acid compositions and particularly to an improved method of increasing the solubility rate of fumaric and/or adipic acid in cold water.

Citric acid has been traditionally used as an acidulant for a variety of beverages, both alcoholic and non-alcolic. Thus, citric acid has enjoyed widespread usage in the preparation of carbonated beverages, wines, dry beverage concentrates, beer and the like. Since adipic and fumaric acids are more effective than citric acid, and are completely edible and non-hydroscopic, the former acids have previously been considered as potentially attractive beverage acidulants. However, they have one serious drawback, an exceedingly low and slow solubility in water. Less than one part of fumaric acid, and only about one and a half parts of adipic acid, can be dissolved in 100 parts of water at approximately room temperature. By contrast, citric acid readily dissolves in less than its own weight of water at moderate temperatures.

There have been many methods suggested to increase the solubility rate of fumaric and/or adipic acid in cold water. These prior efforts have centered about compositions formed by admixing the fumaric and/or adipic acid with additives that have some favorable effect on the cold water solubility rate. Generally speaking, many additives which increase the solubility rate of fumaric acid and adipic acid have enough toxicity to exclude them from products for human consumption. Other additives and methods fail to increase the solubility rate sufficiently and/or, as an ingredient in a composition, leave much to be desired in storage characteristics.

It has been discovered that an acid compoistion readily soluble in cold water and having improved storage characteristics can be prepared by admixing a crystalline sugar with an acidulant selected from the group consisting of fumaric acid and/or adipic acid and adding to the resulting admixture an additive selected from the group consisting of sodium hydroxide, the sodium salt of said acidulant, and citric acid.

It is an object of this invention to provide new and improved granular fumaric acid and adipic acid compositions overcoming the disadvantages of the prior art. More specifically, it is an object of this invention to provide granular fumaric acid and adipic acid compositions that are readily soluble in cold water, have improved storage characteristics, and are fit for human consumption.

These and other objects of this invention will be apparent from the following specification.

As previously stated, the acid compositions readily soluble in cold water compositions comprise an acidulant selected from the group consisting of fumaric acid and adipic acid, a crystalline sugar, and an additive selected from the group consisting of sodium hydroxide, the sodium salt of said acidulant, and citric acid. Within the above group of additives, it is preferred to utilize one of the sodium salts, and to form it in situ by adding a sodium hydroxide solution which promptly reacts with the acid to form the desired salt.

It is also preferred that the additive form a substantially uniform coating over each of the admixture particles. However, since it is exceedingly difficult to verify the presence of a coating on all of the admixture particles, the invention is not limited to this concept. It has been found that it is adequate to provide an intimate mixture in which the additive is substantially uniformly distributed throughout the bulk of the admixture. The resulting acid composition can be prepared in a number of ways.

For example, commercially available acidulants have non uniformly sized particles ranging from about 25 to 250 microns. It is known that the solubility characteristics of such acidulants can be enhanced by reducing the average particle size, preferably from about 20 to 50 microns. It is to be understood however, that the particle size selected for the final product is entirely a matter of choice. It is only necessary that the solubility enhancing additive be substantially uniformly distributed in the acidulant-sugar admixture.

The commercially available acidulants can be admixed with a crystalline sugar, such as dextrose, and thereafter milled, or milled separately in order to provide uniformly sized particles. The additive can be added to the admixture or to the acid particles in each case, either before or after milling. It is a matter of choice and/or the conventional physical state of the additive, whether the addition of the additive is made as a liquid or solid.

The additive can be added as a solid to the acidulant or acidulant-sugar admixture prior to milling in order to obtain the requisite intimacy of mixing. Alternately, the additive can be added in a liquefied state utilizing a solvent, heat, or both. Dilute solutions are preferred in order to minimize local concentration of the liquefied additive on the acidulant or admixture particles. It is preferred that the additive be dissolved in water or other relatively volatile solvents.

When the additive is added as a solution, it is necessary to remove the solvent. During the drying process, agglomerates generally are formed. It is therefore necessary to mill the resulting composition to obtain the preferred particle size. Accordingly, it is preferred to add the solution of the additive to the sugar-acidulant admixture, or the commercially available acidulant particles, prior to any milling.

The quantity of solution to be added should be sufficient to adequately wet the particles and thereby insure thorough dispersion of the selected additive. Further, said quantity should be insufficient to cause a portion of the particles to dissolve.

While dextrose is the preferred crystalline sugar, other crystalline monosaccharides, disaccharides, polysaccharides, and the like, may be employed. The sugar selected should be of such a nature that the composition of the present invention, when dried, will be crystalline.

The granular acid composition can vary considerably depending upon the final application. Generally, compositions containing less than 2 parts of the crystalline sugar and less than 0.01 part of the selected additive, based on per unit weight of the acid, do not exhibit the requisite solubility, whereas the use of more than 4 to 5 parts of the crystalline sugar and above 0.5 part of the selected additive serves no useful purpose. The preferred range is from about 3 to 3.5 parts of crystalline sugar and from 0.015 to 0.05 part of the selected additive, based on per unit weight of the acid. It is to be understood that the amount of additive or crystalline sugar utilized is a matter of choice and is variable. The desired concentration of any one of the ingredients in the final product determines the upper limit.

The invention and the manner in which it accomplishes its objects will be readily understood by reference to the following specific examples of preferred embodiments thereof. In these examples and throughout the specification, all proportions are expressed in parts by weight unless otherwise specified.

EXAMPLE 1

To a suitable mixing apparatus, there are added about 228 parts of dextrose and about 66 parts of dry, milled, commercially available, food grade fumaric acid. After thoroughly blending the dry dextrose and acid, there is slowly sprayed on the dry mixture, over a period of about 5 minutes, about 30 parts of aqueous sodium hydroxide comprising 27 parts of water and 3 parts of sodium hydroxide. The dampened mixture is agitated for an additional 15 minutes. The damp, blended mixture is then dried in an oven at 50° C. and milled to provide an average particle size of about 20 to 50 microns. The acid composition thus obtained is granular, readily soluble in cold water, and contains about 3.5 parts of dextrose and about 0.045 part of sodium hydroxide (as sodium fumarate) per unit weight of fumaric acid.

A control sample is prepared as in Example 1 except that 30 parts of water are used without any additive. The product thus obtained is not readily and completely soluble in cold water.

EXAMPLE 2

The procedure of Example 1 is substantially repeated using 304 parts of dextrose, 88 parts of milled fumaric acid, 1.3 parts of sodium hydroxide, and 35 parts of water. The dried product thus obtained is readily soluble in cold water and contains about 3.4 parts of dextrose and 0.015 part of sodium hydroxide (as sodium fumarate), based on per unit weight of fumaric acid.

EXAMPLE 3

The procedure of Example 1 is repeated using 304 parts of dextrose, 88 parts of milled fumaric acid, 4.4 parts of citric acid, and 30 parts of water. The product obtained is readily soluble in cold water and contains about 3.5 parts of dextrose and about .05 part of citric acid, based on per unit weight of fumaric acid.

EXAMPLE 4

The acid composition of Example 1 is prepared by milling 228 parts of dextrose, 66 parts of fumaric acid, and 3 parts of solid sodium hydroxide for a time sufficient to intimately mix the ingredients and provide an average particle size of from 25 to 50 microns. The resulting acid composition is readily soluble in 5° C. water.

To ascertain the product solubility characteristics of Examples 1–3, a 0.5-gram sample of each product is added to 100 ml. of water at 5° C., stirred for one minute, and observed. The observations are set forth in Table I.

*Table I*

| Example | Foam | Surface | Solids | Wetting |
| --- | --- | --- | --- | --- |
| Control | 1.5 | 1 | 2.5 | 4 |
| 1 | 1 | 1 | 1.5 | 1 |
| 2 | 1.5 | 1 | 1 | 1 |
| 3 | 1 | 1 | 3 | 1 |

1—Totally acceptable; 2—Acceptable; 3—Good; 4—Fair; 5—Poor; 6—Unacceptable.

The procedures followed in the above examples are substantially repeated using adipic acid in place of fumaric acid. These methods result in the production of adipic acid compositions comparable to the fumaric acid compositions.

The foregoing examples are repeated wherein the additive is dissolved in ethyl alcohol. The resulting acid compositions display substantially identical solubility and storage characteristics as the acid compositions utilizing water as the solvent for the additive.

The term "readily soluble in cold water" is used herein to identify fumaric acid or adipic acid compositions which are substantially completely dissolved in about 100 parts of water at a temperature of about 5° C. within one minute and with minimum agitation. The intensity of agitation required need be only sufficient to expose the acid particles to successive portions of water and to eliminate the formation of a quiescent envelope of a saturated acid solution about each of the particles.

While the present invention has been described with particular reference to specific examples, it is not to be limited thereby, but reference is to be had to the appended claims for a definition of its scope.

What is claimed is:

1. A granular acid composition having an average particle size of from about 20 to 50 microns and readily soluble in cold water comprising, per unit weight of an acidulant selected from the group consisting of fumaric acid and adipic acid, at least about 2 parts of a crystalline sugar and at least about 0.01 part of an additive selected from the group consisting of sodium hydroxide, the sodium salt of said acid, and citric acid.

2. The granular acid composition of claim 1 wherein said additive is uniformly coated on said granules.

3. A method of preparing a granular acid composition readily soluble in cold water which comprises forming an admixture comprising, per unit weight of an acidulant selected from the group consisting of fumaric acid and adipic acid, at least about 2 parts of a crystalline sugar and at least about 0.01 part of an additive selected from the group consisting of sodium hydroxide, the sodium salt of said acidulant, and citric acid, and thereafter milling said admixture to an average particle size of from about 20 to 50 microns.

4. A method of preparing a granular acid composition readily soluble in cold water which comprises forming an admixture comprising, per unit weight of an acidulant selected from the group consisting of fumaric acid and adipic acid, at least about 2 parts of a crystalline sugar and an aqueous solution containing at least, by weight per unit weight of acidulant, about 0.01 part of an additive selected from the group consisting of sodium hydroxide, the sodium salt of said acidulant, and citric acid, and thereafter drying and milling said admixture to an average particle size of from about 20 to 50 microns.

5. The method according to claim 4 wherein said acidulant is fumaric acid and said additive is sodium hydroxide.

6. The method according to claim 4 wherein said acidulant is adipic acid and said additive is sodium hydroxide.

7. A method of preparing a granular acid composition readily soluble in cold water which comprises mixing about 3 to 3.5 parts by weight of dextrose to one part by weight of fumaric acid, adding about 0.015 to 0.05 part by weight of sodium hydroxide by weight of said fumaric acid, said sodium hydroxide being dissolved in from 5% to 10% water by weight of said added ingredients, drying said sodium hydroxide-wetted additive at a temperature below the decomposition temperature of said ingredients, and thereafter milling said composition to an average particle size of from about 20 to 50 microns.

References Cited by the Examiner

UNITED STATES PATENTS

| | | | |
| --- | --- | --- | --- |
| 2,982,653 | 5/1961 | Block et al. | 99—78 |
| 3,005,715 | 10/1961 | Raffensperger et al. | 99—78 |
| 3,009,810 | 11/1961 | Raffensperger et al. | 99—78 |
| 3,009,811 | 11/1961 | Raffensperger et al. | 99—78 |
| 3,011,894 | 12/1961 | Block et al. | 99—78 |
| 3,016,299 | 1/1962 | Raffensperger et al. | 99—78 |
| 3,016,300 | 1/1962 | Raffensperger et al. | 99—78 |

A. LOUIS MONACELL, *Primary Examiner.*

R. S. AULL, *Assistant Examiner.*